(12) United States Patent
Sumali

(10) Patent No.: US 11,262,642 B2
(45) Date of Patent: Mar. 1, 2022

(54) MOUNTING PLATE

(71) Applicant: Harjanto Sumali, Belmont, CA (US)

(72) Inventor: Harjanto Sumali, Belmont, CA (US)

( * ) Notice: Subject to any disclaimer, the term of this patent is extended or adjusted under 35 U.S.C. 154(b) by 0 days.

(21) Appl. No.: 16/986,074

(22) Filed: Aug. 5, 2020

(65) Prior Publication Data

US 2021/0041770 A1 Feb. 11, 2021

Related U.S. Application Data

(60) Provisional application No. 62/884,100, filed on Aug. 7, 2019.

(51) Int. Cl.
*G03B 17/56* (2021.01)
*F16M 13/02* (2006.01)
*F16M 13/04* (2006.01)

(52) U.S. Cl.
CPC ......... *G03B 17/561* (2013.01); *F16M 13/022* (2013.01); *F16M 13/04* (2013.01); *G03B 17/566* (2013.01)

(58) Field of Classification Search
CPC .............................. G03B 35/08; G03B 17/561
See application file for complete search history.

(56) References Cited

U.S. PATENT DOCUMENTS

| 4,272,177 | A | | 6/1981 | Ottenheimer | |
| 5,725,136 | A | * | 3/1998 | Shires | G03B 17/561 224/257 |
| 5,933,668 | A | | 8/1999 | Hyers | |
| 6,791,770 | B2 | * | 9/2004 | Yamazaki | G02B 7/02 359/819 |
| 9,918,540 | B2 | * | 3/2018 | Fawcett | A45F 3/00 |
| 10,435,117 | B1 | * | 10/2019 | Cifers | B63B 32/77 |
| 2001/0055486 | A1 | | 12/2001 | Visram | |
| 2012/0020656 | A1 | * | 1/2012 | Farmer | G03B 21/54 396/420 |

FOREIGN PATENT DOCUMENTS

| JP | 2011203473 A | * 10/2011 |
| JP | 2011203473 A | 10/2011 |

OTHER PUBLICATIONS

Apex, "Dual Quick Release Plate and Lock for Dual Camera Support", http://apexdigital.com.ph/product/dual-quick-release-plate-and-lock-for-dual-camera-support/, Archive.org (Year: 2016).*

(Continued)

*Primary Examiner* — Clayton E. LaBalle
*Assistant Examiner* — Leon W Rhodes, Jr.
(74) *Attorney, Agent, or Firm* — Lee & Hayes, P.C.

(57) ABSTRACT

A system includes a mounting plate to which a plurality of camera devices are mountable, and a stanchion coupled to the mounting plate to support the mounting plate. The mounting plate includes a first recess defined in a top surface of the mounting plate to mount a first camera having a first focal length, and a second recess defined in the top surface of the mounting plate to mount a second camera having a second focal length. The first recess and the second recess are defined in the top surface of the mounting plate such that the first camera and the second camera are simultaneously mountable.

18 Claims, 6 Drawing Sheets

(56) References Cited

OTHER PUBLICATIONS

Manbily, "Mambili PU-480", http://www.manbily.com/en/products/42.html , Archive.org (Year: 2019).*
Neewer, "Neewer 8"/20.3cm Dual Camera Mount Tripod Bracket", https://www.amazon.com/Neewer-20-3cm-Bracket-Stereoscopic-Photography/dp/B00PAG93ES/, product listing and dated review (Year: 2016).*
"Two Cameras on the one tripod", Photo.net discussion thread https://www.photo.net/discuss/threads/two-cameras-on-the-one-tripod.362855/ (Year: 2009).*
"Two cameras on one tripod", DVinfo.net thread https://www.dvinfo.net/forum/tripod-sticks-heads/102485-two-cameras-one-tripod.html (Year: 2007).*
The PCT Search Report and Written Opinion dated Oct. 28, 2020 for PCT application No. PCT/US20/45062, 18 pages.

* cited by examiner

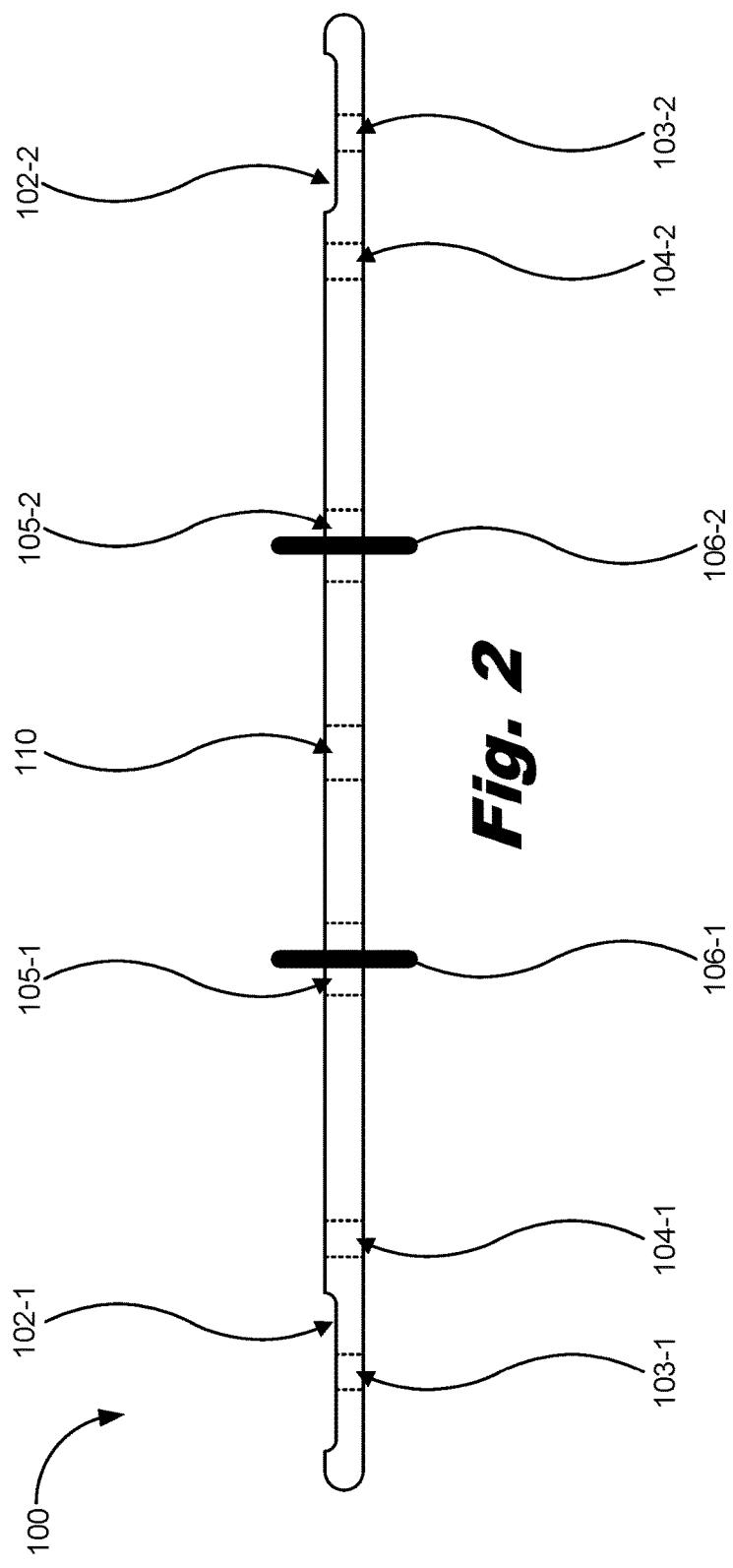
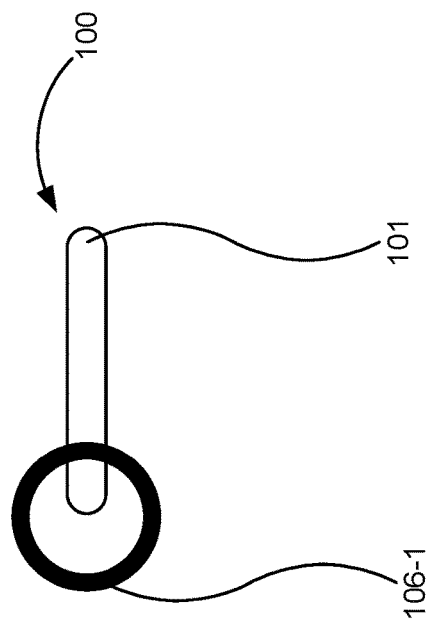

MOUNTING PLATE

RELATED APPLICATION

This application claims the benefit of U.S. Provisional Application Ser. No. 62/884,100, filed Aug. 7, 2019, entitled "MOUNTING PLATE," the entirety of which is incorporated herein by reference.

BACKGROUND

Motion picture photography may include the capturing of images of subjects that move between focal lengths of lenses of two or more cameras. In sporting events such as, for example, a tennis match, an athlete may move from a back-court position to the net. Similarly, in a track and field event, for example, participants may run around a track with one or more ends of the track being further from the photographer than the middle portion of the track. Other sports where the athletes' movements are unpredictable and fast may include, for example, soccer, football, rugby, and volleyball, among others. Further, other sports where the athletes' movements are relatively more predictable, but in which athletes move quickly may include auto and motorcycle racing, bicycle racing, baseball, and softball, among other sports. In these and other scenarios, the subject matter to be captured by the photographer may move between one or more focal lengths of lenses optically coupled to a number of imaging devices (i.e., cameras).

SUMMARY

In an example embodiment of the present disclosure, a system includes a mounting plate to which a plurality of camera devices are mountable, and a stanchion coupled to the mounting plate to support the mounting plate. The mounting plate also includes a first recess defined in a top surface of the mounting plate to mount a first camera having a first focal length, and a second recess defined in the top surface of the mounting plate to mount a second camera having a second focal length. The first recess and the second recess are defined in the top surface of the mounting plate such that the first camera and the second camera are simultaneously mountable.

In another example embodiment of the present disclosure, a mounting plate includes a first recess defined in a top surface of the mounting plate to mount a first camera; having a first focal length; and a second recess defined in the top surface of the mounting plate to mount a second camera having a second focal length. The first recess and the second recess are defined in the top surface of the mounting plate such that the first camera and the second camera are simultaneously mountable.

BRIEF DESCRIPTION OF DRAWINGS

FIG. 2 is a plane side view of the mounting plate in accordance with an example embodiment of the present disclosure.

FIG. 3 is a plane end view of the mounting plate, in accordance with an example embodiment of the present disclosure.

DETAILED DESCRIPTION

Figure 1:
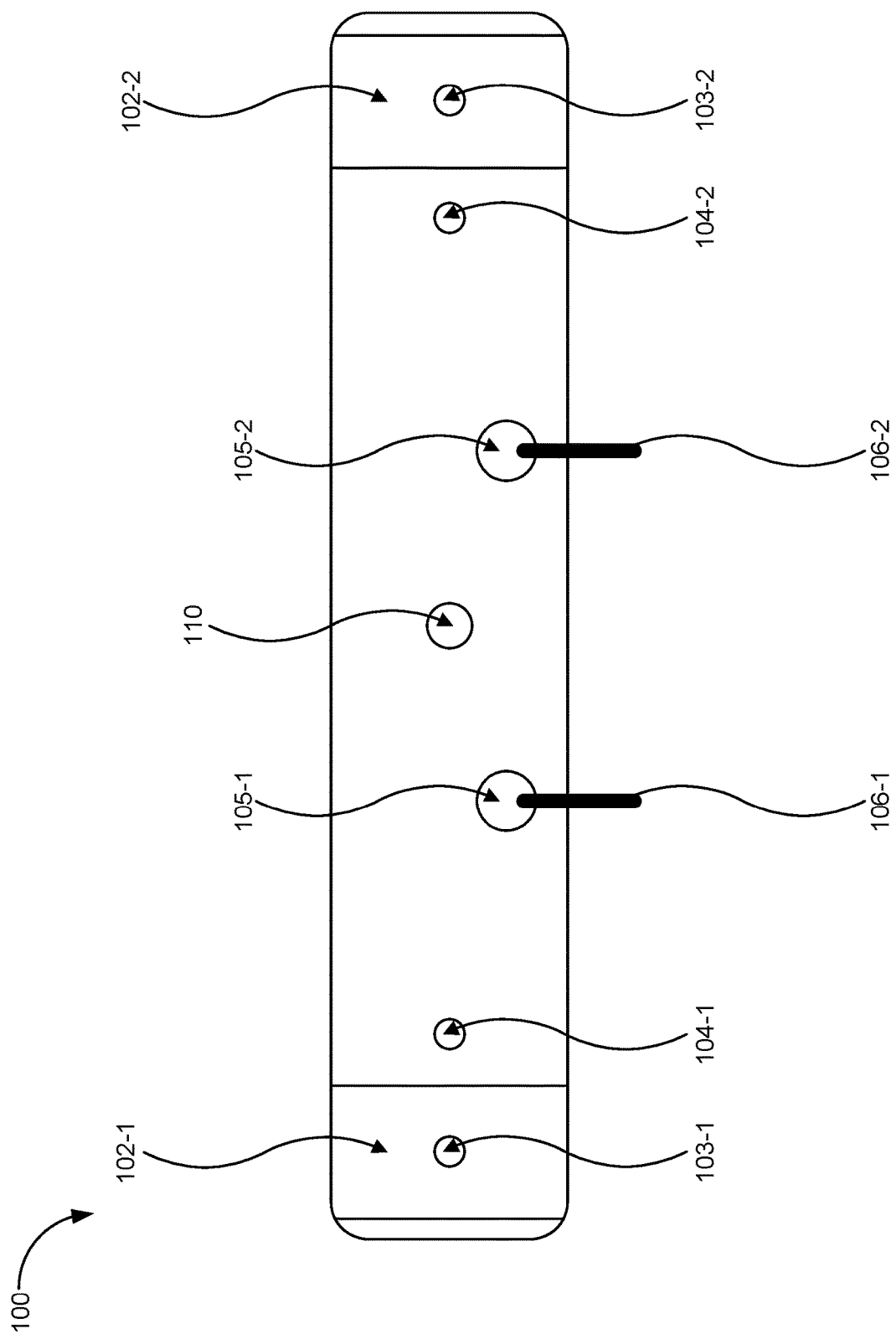
FIG. 1 is a plane top view of a mounting plate, in accordance with an example embodiment of the present disclosure.

Wherever possible, the same reference numbers will be used throughout the drawings to refer to the same or like parts. The present disclosure relates to a system and method of capturing photographs such as motion picture photographs. More specifically, the present disclosure relates to a system including a camera mount for mounting a plurality of cameras thereon to allow for motion picture photography of subject matter that may be moving between focal lengths of a lens of a first camera mounted to the camera mount and at least a second camera mounted to the camera mount.

When capturing images of subject matter that moves between focal lengths of lenses of two or more cameras, photographers may have in their possession two or more cameras fitted with the lenses that have different focal lengths in order to capture images of the subject matter that may move between positions close to the photographer and positions relatively farther from the photographer. However, even with the advantage of having these multiple cameras and being able to capture images at a broader range of distances, moving from one camera to another may be cumbersome and ineffective in allowing the photographer to capture the images of the subject in time. For example, in a tennis match, the photographer may be capturing images of an athlete playing at a back-court position. If the athlete were to quickly move to the net as often happens in tennis, the photographer may not have enough time to switch from a first camera that has a first focal length (e.g., a long focal length to capture images of subjects at relatively farther distances) to a camera with a second focal length (e.g., a relatively shorter focal length to capture images at a relatively closer distance). This may result in the photographer missing the action and being unable to capture a desired image in time before the subject matter such as the tennis player moves from a position where a first camera may capture the subject matter to another where a second camera may capture the subject matter given the different focal lengths of the two cameras.

Further, switching between cameras having lenses of different focal lengths may cause the photographer to accidently damage the cameras and/or the lenses. As the photographer switches between the cameras in order to capture the subject matter with a camera having the appropriate focal length, the photographer may accidentally drop a camera and/or a lens or strike the camera and/or the lens against another object. As these cameras and their associated lenses and accessories may be of great monetary value, damaging the cameras and/or lenses may not only cause the photographer to lose the ability to capture the desired images, but may also cost the photographer greatly in repair or replacement of photography equipment.

An example dual camera mounting arrangement for a wide screen imaging system is described in U.S. Patent Application Publication No. 2004/0201754 A1 (hereinafter referred to as the '754 reference). In particular, the '754 reference describes a dual camera arrangement for capturing a wide field image of a scene. As explained in the '754 reference, two camera devices are arranged in a mount to have overlapping fields of view in order to capture a wide filed image of a scene. The images captured by the individual camera devices are stitched together to form a singular wide angle image. The camera devices of the '754 reference are identical and do not function separately to form different images at different focal lengths.

The '754 reference does not, however, describe a system configured to mount two separate cameras that are able to capture images with different focal lengths. Example embodiments of the present disclosure are directed toward overcoming the deficiencies described above.

Figure 4:
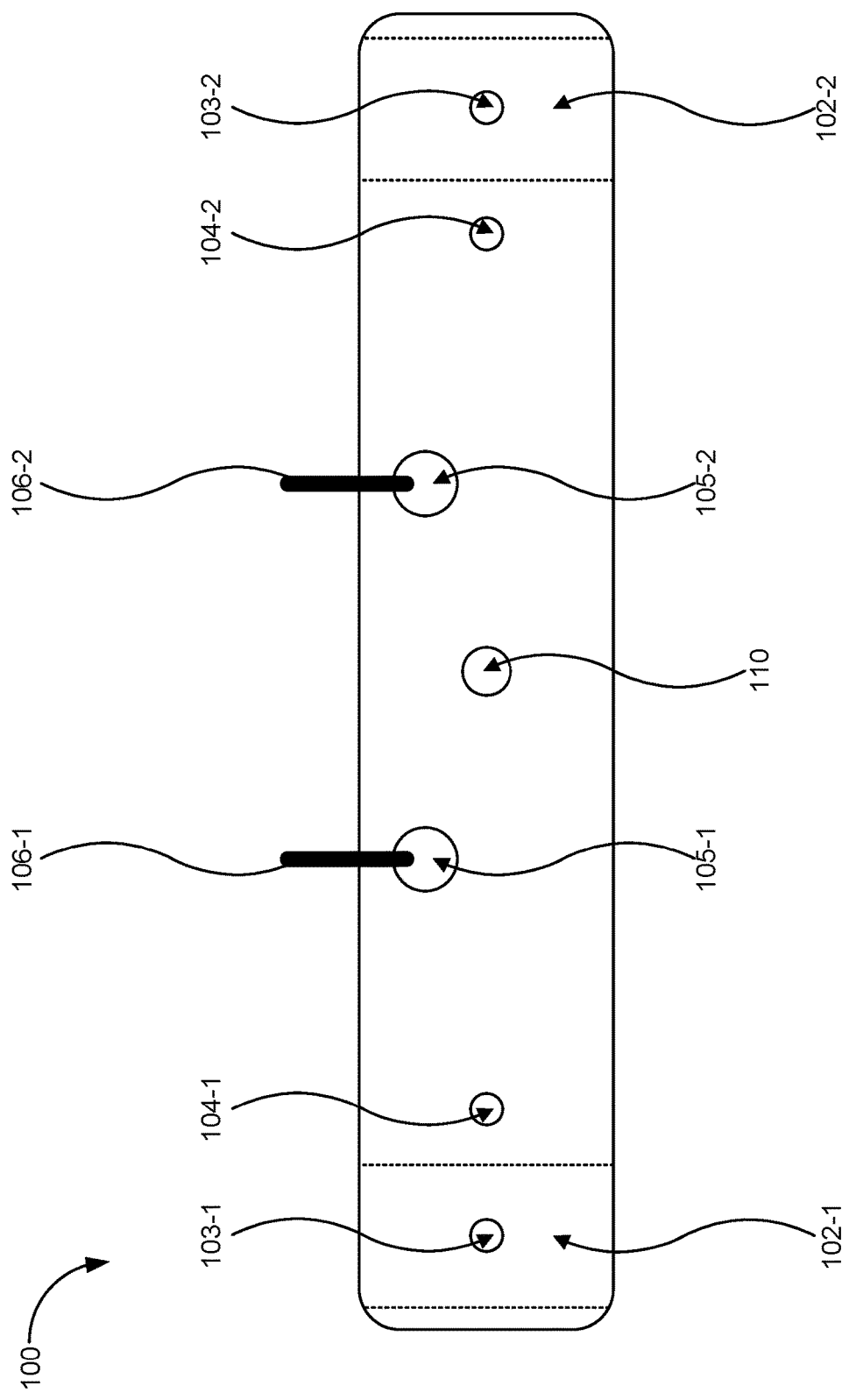
FIG. 4 is a plane bottom view of a mounting plate, in accordance with an example embodiment of the present disclosure.
Figure 5:
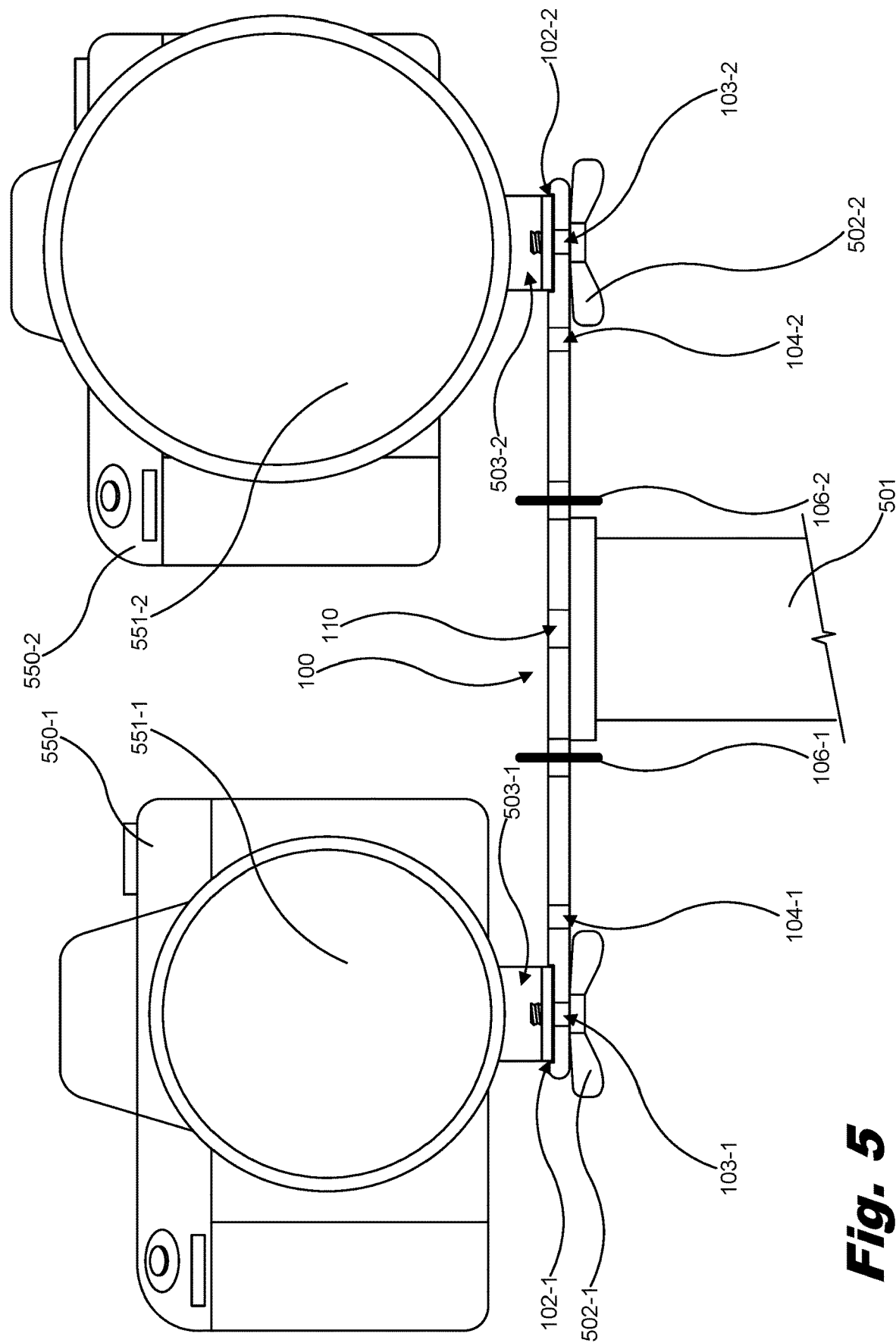
FIG. 5 is a plane side view of a system including a mounting plate, a stanchion, and a plurality of camera devices, in accordance with an example embodiment of the present disclosure.
Figure 6:
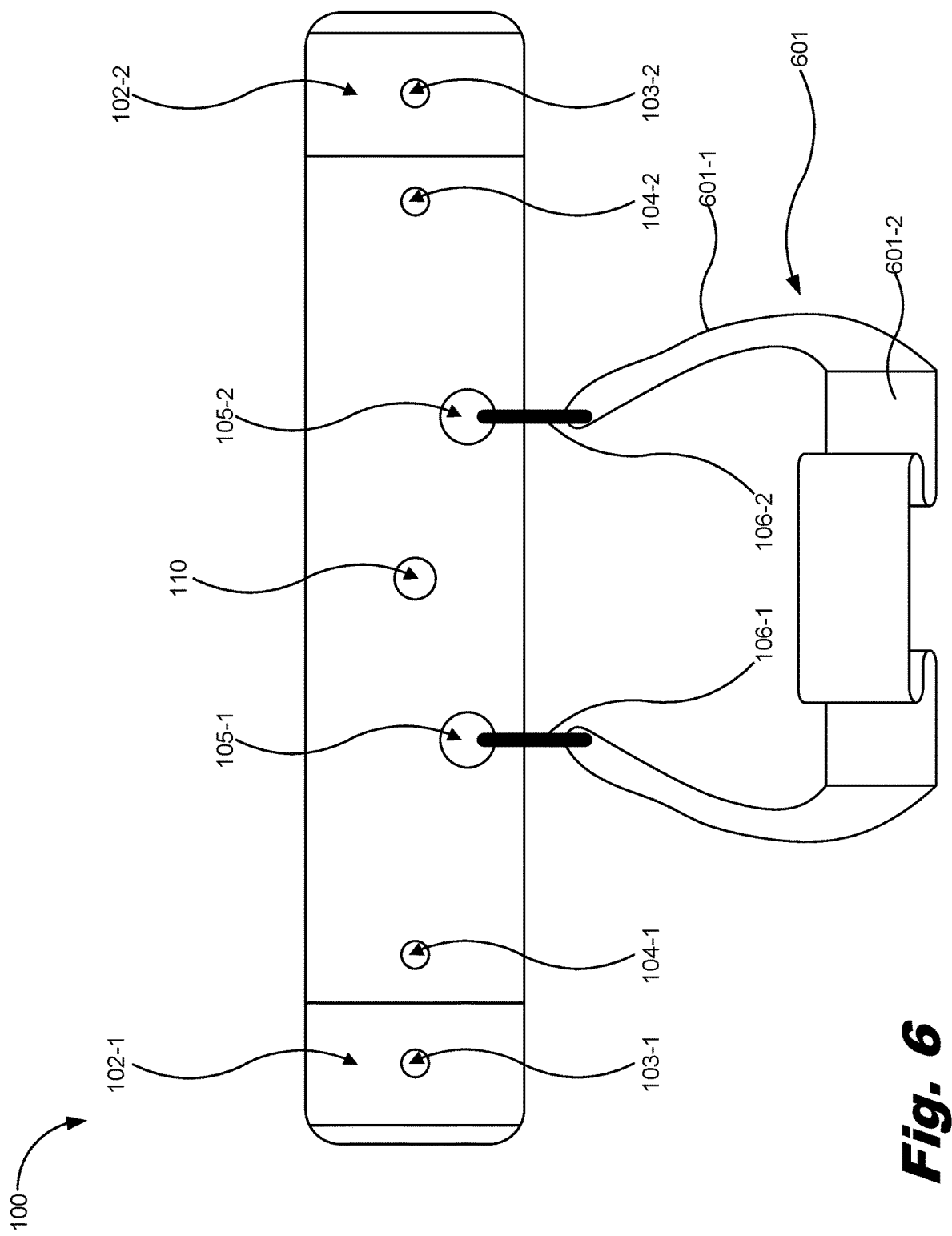
FIG. 6 is a plane top view of a mounting plate including a strap, in accordance with an example embodiment of the present disclosure.
Figure 7:
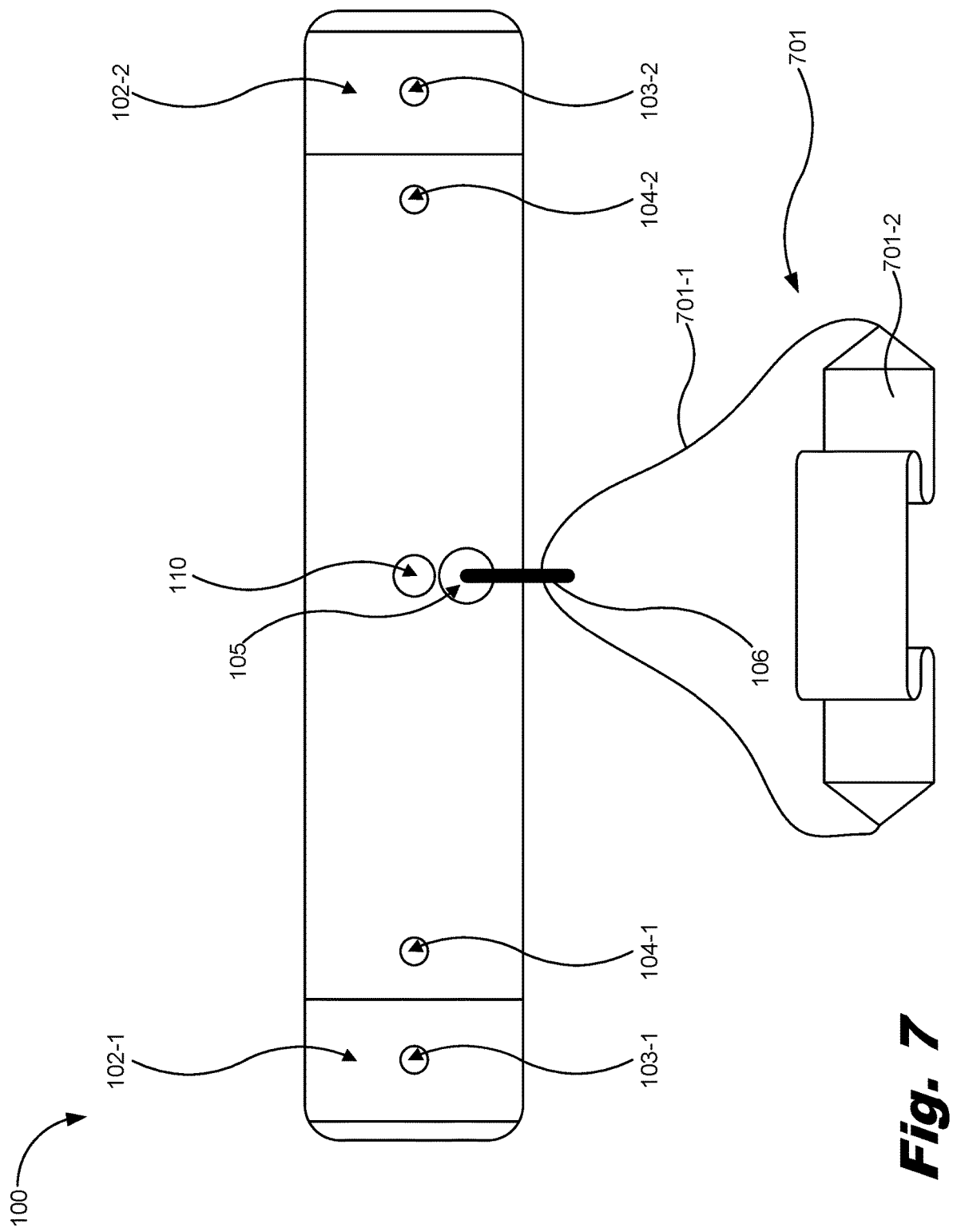
FIG. 7 is a plane top view of a mounting plate including a strap, in accordance with an example embodiment of the present disclosure.

Referring now to the figures, FIG. 1 is a plane top view of a mounting plate 100, in accordance with an example embodiment of the present disclosure. FIGS. 2 through 6 will be described in connection with FIG. 1 as they depict the mounting plate 100 in different orientations and, in the case of FIG. 5, with camera devices 550-1, 550-2 (collectively referred to herein as 550) coupled to the mounting plate 100. FIG. 2 is a plane side view of the mounting plate 100 in accordance with an example embodiment of the present disclosure. Further, FIG. 3 is a plane end view of the mounting plate 100, in accordance with an example embodiment of the present disclosure. FIG. 4 is a plane bottom view of a mounting plate 100, in accordance with an example embodiment of the present disclosure. FIG. 5 is a plane side view of a system 500 including a mounting plate 100, a stanchion 501, and a plurality of camera devices 550, in accordance with an example embodiment of the present disclosure. FIG. 6 is a plane top view of a mounting plate 100 including a strap 601, in accordance with an example embodiment of the present disclosure. FIG. 7 is a plane top view of a mounting plate 100 including a strap 701, in accordance with an example embodiment of the present disclosure.

The mounting plate 100 may be made of any material with a sufficient yield strength, compressive strength, tensile strength, fatigue strength, and impact strength to safely carry a plurality of camera devices 550 and lenses 551 without deforming or failing. In one example, the mounting plate 100 is made of aluminum or an aluminum alloy. In another example, the mounting plate 100 is made of a metal, a polymer, a ceramic, or a composite material, among other types of materials and/or a plastic, a rubber, a wood, or a metal alloy, among other materials.

The mounting plate 100 is used in motion picture photography in situations where subjects move between focal lengths of camera devices. In some situations, photographers may carry with them a plurality of camera devices with lenses 551-1, 551-2 (collectively referred to herein as 551) affixed to the camera devices 550 that allow for capturing the subject in relatively closer distances and capturing the subject in relatively farther distances. The subject may include any object that may move within space between focal lengths of the lenses 551. In one example, the subject is an individual such as a participant in a sporting event. Because of the nature of motion of a sport participant's movement within boundaries or areas of performing in the sporting event such as fields, courts, and pitches, a photographer may have several cameras 550 with lenses 551 having different focal lengths. This allows the photographer to capture the subject no matter where the subject is located relative to the photographer. This may prove especially effective in situations such as the above-exemplified sporting event where the subject may move past the focal length of a lens of a first camera and into the focal length of a lens of the second camera where images may be captured most effectively.

A focal length of a camera device 550 and its lens 551 may be defined as a measure of how strongly the optics of the lenses 551 associated with the camera device converges or diverges light. Within the lenses 551 of the camera devices 550, the focal length is the distance over which initially collimated (i.e., parallel) rays are brought to a focus. A camera device 550-1 that includes a lens such as lens 551-1 with a relatively shorter focal length has greater optical power than one with a relatively longer focal length; that is, the lens with the relatively shorter focal length bends the rays more sharply, bringing them to a focus in a shorter distance. In contrast, a camera device 550-2 that includes a lens such as lens 551-2 with a relatively longer focal length has weaker optical power than one with a relatively shorter focal length; that is, it bends the rays less sharply, bringing them to a focus in a longer distance. In photography where the subject is essentially infinitely far away, longer focal length (i.e., lower optical power) leads to higher magnification and a narrower angle of view of the subject. Conversely, shorter focal length or higher optical power is associated with lower magnification and a wider angle of view. Thus, the use of two separate lenses 550 with different focal lengths allows for photographs to be taken from a larger range of distances.

Further, having two separate camera devices 550 with lenses 551 having differing focal lengths provides for the ability to capture images without having to change the lens of a single camera device from a short-focal-length lens to a long-focal-length lens and visa versa as the photographer is seeking to capture the images of the subject as the subject moves between the focal lengths. Still further, changing the lenses in this manner may result in damage to the camera devices 550 and/or the lenses 551. Even still further, changing the lenses in this manner may result in the introduction of contaminants such as dirt or dust into the internal portions of the camera device 550 and the lenses 551.

In order to safely carry the camera devices 550 without a significant risk of damaging the camera devices 550 and their lenses 551 and other elements, the mounting plate 100 allows for a plurality of camera devices 550 to be securely and safely coupled thereto. The mounting plate 100 includes a first recess 102-1 and a second recess 102-2(collectively referred to herein as 102) defined within the top surface of the mounting plate 100 to mount a first camera device 550-1 and a second camera device 550-2. In one example, the first recess 102-1 and the second recess 102-2 include a width of approximately between 1 in. and 1.25 in.

As depicted in FIG. 5, the first camera device 550-1 and the second camera device 550-2 may be coupled to the mounting plate 100 via a first lens shoe 503-1 and a second lens shoe 503-2 (collectively referred to herein as 503), respectively. A lens shoe 503 may also be referred to as a shoe mount, and may be used to couple the lenses 551 to the mounting plate 100 in various ways.

Although in one example, the camera devices 550 may be coupled to the mounting plate 100 directly, the camera devices 550 may be coupled to the mounting plate 100 by coupling the respective lenses 551 to a lens shoe 503. Coupling the camera devices 550 to the mounting plate 100 via the lens shoes 503 coupled to the lenses 551 allows for the camera devices 550 be coupled at a center of gravity of the system formed by the camera devices 550 and their respective lenses 551 since the lenses 551 may protrude past the mounting plate 100 and have enough weight in its distal ends with respect to the camera devices 550 such that the center of gravity of the cameras including the lenses is moved towards and at the lenses 551.

The lens shoes 503 may be coupled to the mounting plate 100 within the recesses 102 using a respective fastener 502-1 and 502-2 (collectively referred to herein as 502). In one example, the fastener 502 may be a wing nut as depicted in FIG. 5 so as to allow the photographer to fasten the lens shoes 503 to the mounting plate 100 without the use of tools such as a screw driver. However, the fastener 502 may be any non-permanent or permanent fastener. In one example, the fasteners 502 may be permanent fasteners. In this example, the permanent fasteners may be any fastener that does not enable the lens shoes 503 and the mounting plate 100 to be assembled and disassembled repeatedly without destroying the permanent fastener. Permanent fasteners may include, for example, rivets, welds, and adhesives, among other permanent fasteners. In this example, the lens shoes 503 may be permanently coupled to or integrated into the mounting plate 100, while leaving the lenses 551 to be coupled to the lens shoes 551 as the camera devices 550 and/or lenses 551 are coupled and decoupled to and from the mounting plate 110 and the integrated lens shoes 503.

In another example, the fasteners 502 may be non-permanent fasteners as depicted in FIG. 5. Non-permanent fasteners, in contrast, may be any fastener that does enable the lens shoes 503 and the mounting plate 100 to be assembled and disassembled repeatedly without destroying the permanent fastener. Non-permanent fasteners may include, for example, a screw, a bolt, a nut, a wing nut, a quick release skewer, other types of fasteners, and combinations thereof. In this example, the lenses 551 may include coupling devices that couple the lens shoes 503 to the lenses 551 or the lens shoes 503 may be integrated into the housing or other portions of the lenses 551.

In examples where the lens shoes 503 are coupled to the mounting plate 110 using non-permanent fasteners, the fasteners 502 may couple the lens shoe 503 to the mounting plate 100 via a first aperture 103-1 and a second aperture 103-2 (collectively referred to herein as 103), respectively. The first aperture 103-1 and second aperture 103-2 may be threaded to receive, for example, the threaded wing nut 502. The threading within the first aperture 103-1 and a second aperture 103-2 allows the wing nut 502 to thread into the apertures 103 and thread into the lens shoes 503. In this example, the lens shoes 503 also include threaded apertures. As the user seeks to couple the lens shoes 503 to the mounting plate 100, the user may ensure that the lens shoes 503 are fully-inserted and seated into the recesses 102 defined in the mounting plate 100. In this position, the lens shoes 503 may couple with the respective wing nuts 502 immediately as the wing nuts 502 clear the top side of the mounting plate 100 as the wing nuts 502 are threaded through the apertures 103 and interface with the bottom side of the lens shoes 503. This allows for the lens shoes 503 to be tightly coupled to the mounting plate 100 without the presence of a gap between the lens shoes 503 and the top surface of the recesses 102 of the mounting plate 100 as the threading of the wing nuts 502 engage with the threads defined in the apertures 103 and the corresponding apertures within the lens shoes 503.

In examples where the first aperture 103-1 and/or the second aperture 103-2 are not threaded, and fastener 502 such as a quick release skewer maybe used. A quick release skewer is any mechanism for coupling two elements together and includes a rod threaded on one end and a lever operated cam assembly on the other. In this manner, the rod may be inserted into the apertures 103 and through a mating aperture in the respective lens shoes 503, and the cam assembly may be actuated via the lever to tighten the quick release skewer and removably couple the lens shoes 503 to the mounting plate 100. The lens shoes 503 are then coupled to respective lenses 551 holding the camera devices 550, and, in this manner, the camera devices 550 are secured to the mounting plate 100. In one example, the lens shoes 503 are coupled to the respective lenses 551 via a mounting collar that couples around the lens 551, a coupling device formed into the lens 551, a coupling device formed as an integral portion of the lens 551, or other types of coupling devices.

A third aperture 104-1 and a fourth aperture 104-2 may also be defined within the mounting plate 100. The third aperture 104-1 and the fourth aperture 104-2 may be defined in the mounting plate 100 anywhere outside the recesses 102 and allow for other devices as well as camera devices 550 and/or lenses 551 to be coupled to the mounting plate 100 at other positions along the mounting plate 100 and using other types of coupling devices apart from the lens shoes 503. In one example, the third aperture 104-1 and a fourth aperture 104-2 may be threaded or unthreaded.

A stanchion aperture 110 may also be defined within the mounting plate 100 in order to allow a stanchion 501 such as a monopod, a bipod, a tripod, or other support to be coupled to the mounting plate 100. A stanchion 501 assists the photographer in holding the camera device 550 steadier, allowing for sharper pictures to be captured at slower camera shutter speeds and/or while using a lens 551 with a relatively longer focal length. Further, a stanchion 501 also assists the photographer in carrying the mounting plate 100, the cameras 550, and the lenses 551 as the photographer moves from one position to another. A proximal end of the stanchion 501 may be coupled to the bottom of the mounting plate via the use of the stanchion aperture 110 and a fastener that couples the stanchion 501 to the mounting plate 100 via the stanchion aperture 110. Once secured to the mounting plate 100, the stanchion 501 may be used to position, orient, and carry the mounting plate 100 and the camera devices 550 coupled thereto. In one example, the stanchion 501 may be coupled to the mounting plate 100 using permanent or non-permanent fasteners. In an example where the stanchion 501 is coupled to the mounting plate 100 using a permanent fastener, the stanchion 501 may be welded, riveted, or adhered to the mounting plate 100 and sold as an integral part of the mounting plate 100.

The mounting plate 100 may also include strap apertures 105-1, 105-2 (collectively referred to herein as 105). The strap apertures 105 may be defined within the mounting plate 100 at a perimeter of the mounting plate 100 to allow for a first ring 106-1 and a second ring 106-2 (collectively referred to herein as 160) to be linked to the mounting plate 100 through respective strap apertures 105 and around an edge of the mounting plate 100. In this manner, the rings 106 may protrude from an edge of the mounting plate 100. The strap apertures 105 and the rings 106 are dimensioned such that the rings 106 move within their respective strap apertures 105 and have a large degree of movement in various directions. The rings 106 coupled to the strap apertures 105 may be made of any material that may hold the weight of the mounting plate 100 and the plurality of camera devices 550 and lenses 551. In one example, the rings 106 are made of a metal, a polymer, a ceramic, or a composite material, among other types of materials and/or a plastic, a rubber, a wood, or a metal alloy, among other materials. In one example, the distance between a center of the first rinq aperture and a center of the second rinq aperture may be approximately 3 inches (in.)

As depicted in FIG. 6, a strap 601 may be coupled to the rings 106. The strap 601 may be of a set length or may include an adjustable length to allow the photographer to carry the mounting plate 100 along with the camera devices 550, lenses 551, and stanchion 501 as the photographer moves around to different positions around the subject matter in order to capture the subject matter at different angles and from different positions.

The strap 601 may be linked to the rings 106 via a looping portion 601-1 that extends through the interior of the rings 106. The looping portion 601-1 may be coupled to a pad portion 601-2 that may provide more comfort to the photographer as the mounting plate 100, cameras 550, and lenses 551 are hung form the photographer's shoulder or neck. In one example, the looping portion 106-1 may be coupled to the rings 106 via a fastening device such as, for example, spring-loaded clips, carabiners, d-rings, hooks, and split rings, among other fastening devices, and the fastening device may, in turn, be coupled to the rings 106.

In one example, as depicted in FIG. 6, the strap apertures 105 may be defined within the mounting plate 100 equidistant from a center of the mounting plate 100 in order to allow for a balancing the weight of the mounting plate 100 around a photographer's neck as the photographer utilizes a strap 601 to hold the mounting plate 100, the cameras 550, and the lenses 551. In another example, as depicted in FIG. 7, the strap 601 may include a single looping portion 601-1 that extends through a single ring 106 and to which is coupled both ends of the pad portion 601-2. In this example, the mounting plate 100 may include a single strap aperture 105 defined in the mounting plate 100 at a center portion so as to allow for a balancing the weight of the mounting plate 100 around a photographer's neck as the photographer utilizes a strap 701 to hold the mounting plate 100, the cameras 550, and the lenses 551.

INDUSTRIAL APPLICABILITY

The present disclosure describes systems for carrying a plurality of camera devices 550 and associated lenses 551. The systems described herein may be used to more effectively capture images of a subject that moves between focal lengths of the lenses 551 of two or more separate camera devices 550. Further, the systems described herein may be used to protect camera equipment including the camera devices 550 and lenses 551.

For example, such systems may enable a photographer to capture images of a subject such as an athlete performing in a sporting event with a decreased or eliminated possibility of missing the opportunity to capture a desired image of the subject. The mounting plate 100 ensures that two or more cameras and their associated lenses are readily available to the photographer for use as the images of the subject matter are captured.

Further, the systems of the present disclosure may assist in reducing or eliminating the potential of damage to photography equipment. This is because the mounting plate 100 securely retains or holds the cameras 550 and lenses 551. The photographer does not have to set down one camera 550 and lens 551 to pick up another camera 550 and lens 551 which may result in the photographer accidentally or inadvertently damaging the cameras 550 and lenses 551.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system, comprising:
    a mounting plate to which a plurality of lenses are mountable; and
    a stanchion coupled to the mounting plate to support the mounting plate,
    wherein the mounting plate includes:
        a first recess defined in a top surface of the mounting plate; and
        a second recess defined in the top surface of the mounting plate;
    a first lens having a first focal length; and
    a second lens having a second focal length different from the first focal length, wherein:
        the first recess and the second recess are defined in the top surface of the mounting plate such that the first lens and the second lens are simultaneously mountable,
        the first recess and the second recess are formed to fit a shoe mount, and the shoe mount includes:
            a first shoe mount coupling the first lens to the mounting plate at the first recess; and
            a second shoe mount coupling the second lens to the mounting plate at the second recess.

2. The system of claim 1, further including:
    a first aperture defined in the first recess to mount the first shoe mount to the mounting plate; and
    a second aperture defined in the second recess to mount the second shoe mount to the mounting plate.

3. The system of claim 1, further including:
    at least one ring aperture defined in the mounting plate; and
    at least one ring coupled to the mounting plate via the ring aperture.

4. The system of claim 3, wherein:
    the at least one ring aperture includes:
    a first ring aperture; and
    a second ring aperture; and
    the at least on ring includes:
        a first ring coupled to the mounting plate via the first ring aperture; and
        a second ring coupled to the mounting plate via the second ring aperture.

5. The system of claim 4, wherein a distance between a center of the first ring aperture and a center of the second ring aperture is approximately 3 inches (in.).

6. The system of claim 3, further including a strap coupled to the at least one ring to hang the mounting plate from an appendage of a user.

7. The system of claim 1, wherein the first recess and the second recess include a width of approximately between 1 in. and 1.25 in.

8. The system of claim 1, wherein the stanchion is a monopod, a bipod, or a tripod.

9. The system of claim 1, wherein the stanchion is permanently coupled to the mounting plate or coupled to the mounting plate via a fastener.

10. The system of claim 1, wherein the first shoe mount and the second shoe mount are coupled to the mounting plate via a quick release skewer.

11. A mounting plate comprising:
a first recess defined in a top surface of the mounting plate; and
a second recess defined in the top surface of the mounting plate;
a first lens having a first focal length:
a second lens having a second focal length;
a first shoe mount coupling the first lens to the mounting plate at the first recess; and
a second shoe mount coupling the second lens to the mounting plate at the second recess,
wherein the first recess and the second recess are defined in the top surface of the mounting plate such that the first lens and the second lens are simultaneously mountable.

12. The mounting plate of claim 11, further comprising:
a first aperture defined in the first recess to mount the first shoe mount to the mounting plate; and
a second aperture defined in the second recess to mount the second shoe mount to the mounting plate.

13. The mounting plate of claim 11, further comprising:
at least one ring aperture defined in the mounting plate; and
at least one ring coupled to the mounting plate via the ring aperture.

14. The mounting plate of claim 13, wherein:
the at least one ring aperture includes:
a first ring aperture; and
a second ring aperture; and
the at least on ring includes:
a first ring coupled to the mounting plate via the first ring aperture; and
a second ring coupled to the mounting plate via the second ring aperture.

15. The mounting plate of claim 13, further comprising a strap coupled to the at least one ring to hang the mounting plate from an appendage of a user.

16. The mounting plate of claim 11, wherein the mounting plate is made of a metal, a metal alloy, a plastic, a wood, or combinations thereof.

17. The mounting plate of claim 11, comprising texturing along at least a portion of a surface of the mounting plate.

18. The mounting plate of claim 11, wherein the first recess and the second recess are dimensioned to fit the first shoe mount and the second shoe mount, respectively.

* * * * *